(12) United States Patent
Kohn

(10) Patent No.: US 6,335,950 B1
(45) Date of Patent: *Jan. 1, 2002

(54) MOTION ESTIMATION ENGINE

(75) Inventor: Leslie Kohn, Fremont, CA (US)

(73) Assignee: LSI Logic Corporation, Milpitas, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,379

(22) Filed: Oct. 14, 1997

(51) Int. Cl.[7] .............................. H04B 1/66; H04N 7/12
(52) U.S. Cl. ................................. 375/240.16
(58) Field of Search ................. 348/415, 416, 348/417, 699, 700, 717, 412, 403, 718; 382/282, 179, 276; 375/240, 240.01, 240.12, 240.13, 240.15, 240.16, 240.29; H04B 1/66; H04N 7/12

(56) References Cited

U.S. PATENT DOCUMENTS

| | | | | |
|---|---|---|---|---|
| 5,426,463 A | * | 6/1995 | Reininger et al. | 348/405 |
| 5,432,543 A | * | 7/1995 | Hasegawa et al. | 348/45 |
| 5,448,310 A | * | 9/1995 | Kopet et al. | 348/699 |
| 5,453,799 A | | 9/1995 | Yang et al. | 348/699 |
| 5,510,857 A | * | 4/1996 | Kopet et al. | 348/699 |
| 5,619,268 A | | 4/1997 | Kobayashi et al. | 348/416 |
| 5,623,313 A | | 4/1997 | Naveen | 348/416 |
| 5,648,819 A | | 7/1997 | Tranchard | 348/416 |
| 5,650,823 A | | 7/1997 | Ngai et al. | 348/415 |
| 5,706,059 A | * | 1/1998 | Ran et al. | 348/699 |
| 5,790,712 A | * | 8/1998 | Fandrianto et al. | 382/276 |
| 5,796,434 A | * | 8/1998 | Lempel | 348/403 |
| 5,801,778 A | * | 9/1998 | Ju | 348/416 |
| 5,878,173 A | * | 3/1999 | Hashimoto et al. | 382/282 |
| 5,946,041 A | * | 8/1999 | Morita | 348/416 |

OTHER PUBLICATIONS

Varhol, P. "Mainstream processors gain DSP features," *Hardware*, pp. 29–32, Sep. 1997.

* cited by examiner

*Primary Examiner*—Chris Kelley
*Assistant Examiner*—Tung Vo

(57) ABSTRACT

An apparatus performs motion estimation based on a reference image and a target image. The apparatus has a command memory for storing a motion estimation command list segment and a search engine connected to the command memory. The search engine retrieves and processes the command list segment stored in the memory. The search engine in turn has a reference window memory containing one or more reference data segments, a target memory containing one or more target data segments, and a data path engine for generating a score for each offset between data in the reference window memory and data stored in the target memory. A result memory receives outputs from the motion estimation search engine in the form of motion estimation result list segments. The reference window memory, target memory, and result memory may be double-buffered to minimize system memory latencies. Moreover, target and reference fetches may be shared by up to four search targets in a split search command. Additionally, the command list segment and the result list segment use an identical format. The size of each command in the command list and each result in the result list is also identical. The identical format and size characteristics allow results generated by a current search to be reused as a part of the command for the next search.

37 Claims, 4 Drawing Sheets

MOTION ESTIMATION ENGINE

BACKGROUND OF THE INVENTION

The invention relates to apparatus and methods for encoding video and image data, and in particular, to apparatus and methods for performing motion estimation.

The emergence of multimedia computing is driving a need for digitally transmitting and receiving high quality motion video. The high quality motion video consists of a plurality of high resolution images, each of which requires a large amount of space in a system memory or on a data storage device. Additionally, about 30 of these high resolution images need to be processed and displayed per second in order for a viewer to experience an illusion of motion. As a transfer of large, uncompressed streams of video data is time consuming and costly, data compression is typically used to reduce the amount of data transferred per image.

In motion video, much of the image data remains constant from one frame to another frame. Therefore, video data may be compressed by first describing a reference frame and then describing subsequent frames in terms of changes from the reference frame. Standards from an organization called Motion Pictures Experts Group (MPEG) have evolved to support high quality, full motion video. A first standard (MPEG-1) has been used mainly for video coding at rates of about 1.5 megabit per second. To meet more demanding application, a second standard (MPEG-2) provides for a high quality video compression, typically at coding rates of about 3–10 megabits per second.

An example of the MPEG compression process is discussed next. Generally, a first frame may not be described relative to any other frame. Hence, only intra (I) frame or non-predictive coding is performed on the first frame. When a second frame is received, the second frame may be described in terms of the I frame and a first forward predicted (P) frame. The compression of the received second frame is delayed until receipt of the first P frame by a processing system. In a similar manner, a third frame is also described in terms of the first I and P frames. The first P frame is formed by predicting a fourth received frame using the first I frame as a reference. Upon computation of the first P frame, the motion estimation engine can process the second and third received frames as bidirectionally (B) predicted frames by comparing blocks of these frames to blocks of the first I and P frames.

One primary operation performed by the motion estimation engine is block matching. The block matching process identifies a block of image data that should be used as a predictor for describing the current target block. To identify the proper predictor, tokens containing blocks of picture elements (pel) such as a 16×16 pel block describing the current macroblock are received and compared against the content of a search window.

The block matching process computes a mean absolute difference (MAD) between data stored in the target block and blocks at various offsets in the search window. In this process, corresponding data from the two blocks being compared are subtracted, and the sum of the absolute values of the pel differences are calculated. The smaller the MAD, the better the match between the blocks. The motion estimation engine keeps track of the smallest MAD computed during the search process to determine which of the block in the search window is the best match to the input token. A motion vector describing the offset between the current frame and the best match block is then computed. The motion vector is subsequently sent back to a host processor in the form of an output token.

Although the motion estimation process may be a full, exhaustive block matching search, a multiple step hierarchical search to either a full or a half pixel search resolution is generally performed. In the hierarchical search approach, a best matching block is first found using a low resolution macroblock containing fewer data points than the full resolution image. Once the best matching block has been found, a full resolution search in the vicinity of the best matching block can be performed. This sequence reduces the total number of computations that must be performed by the motion estimation engine as fewer individual pel comparisons are performed in the reduced resolution image. Hence, the appropriate macroblock from which to compute the motion vector is more quickly determined.

As the motion estimation process is compute intensive, dedicated hardware is typically used to perform this function. The hardware may be coupled tightly to a processor or alternatively, may be implemented as a hard wired control logic. A tight coupling with the processor allows flexibility in implementing the search process. Flexibility is desirable, as different video applications would benefit from different levels of processing.

Although flexible, the tight coupling approach does not provide as high performance as the hard wired approach. The hard wired approach delivers high performance as it minimizes the burden of motion estimation searching on the processor and thus releases processing cycles otherwise needed for the encoding process. However, the performance associated with the hard wired approach is achieved at the expense of reductions in the flexibility of handling complex search operations.

SUMMARY OF THE INVENTION

An apparatus performs motion estimation based on a reference image and a target image in a flexible, yet high performance manner. The apparatus has a command memory for storing a motion estimation command list segment and a search engine connected to the command memory. The search engine retrieves and processes commands stored in the command list segment. The search engine in turn has a reference window memory containing one or more reference data segments, a target memory containing one or more target data segments, and a data path engine for generating a sum of absolute differences between data in the reference window memory and data stored in the target memory. A result memory receives outputs from the motion estimation search engine in the form of motion estimation result list segments.

In one aspect of the invention, each of the reference window memory, target memory and result memory is double-buffered so that motion estimation operations can proceed concurrently with data transfers associated with the next motion estimation operation.

In another aspect, the apparatus allows reference fetches to be shared by up to four adjacent search targets in a split search command. This is accomplished by fetching a reference window common to the adjacent search targets prior to performing the motion estimation. By reducing unnecessary data transfers over the bus, performance is enhanced while bus contention is reduced.

In another aspect of the invention, commands in the command list segment and results in the result list segment share an identical format. The size of each command in the command list and each result in the result list is also identical. The identical format and size allows the result generated by a previous search to be reused as a part of the command of the next hierarchical search.

Advantages of the present invention include the following. The apparatus off-loads much of the motion estimation processing from the processor while allowing the processor to retain full control of critical search parameters, including the number of levels, search regions and range, target size, horizontal and vertical decimation, field versus frame search, among others. Thus, flexibility and high performance are maintained.

The double buffering of the reference window memory, the target memory and result memory results in a performance advantage, as the motion estimation processing can operate on data stored in one set of the double-buffered memory devices while the other set can load data from a system memory. Hence, latencies associated with the system memory access are hidden from the operation of the motion estimation engine.

Additionally, the common format in commands and results allows the results of the current search to be used as part of the next search command in the sequence of hierarchical search or for motion compensation. The ease of reusing the fields of the current result eliminates unnecessary processing of intermediate search results, thus enhancing performance. Moreover, the split search command capability allows the reference and target fetches to be shared by all targets in the split search command. This feature reduces unnecessary fetches and bus loading by up to four times.

DESCRIPTION

Figure 1:
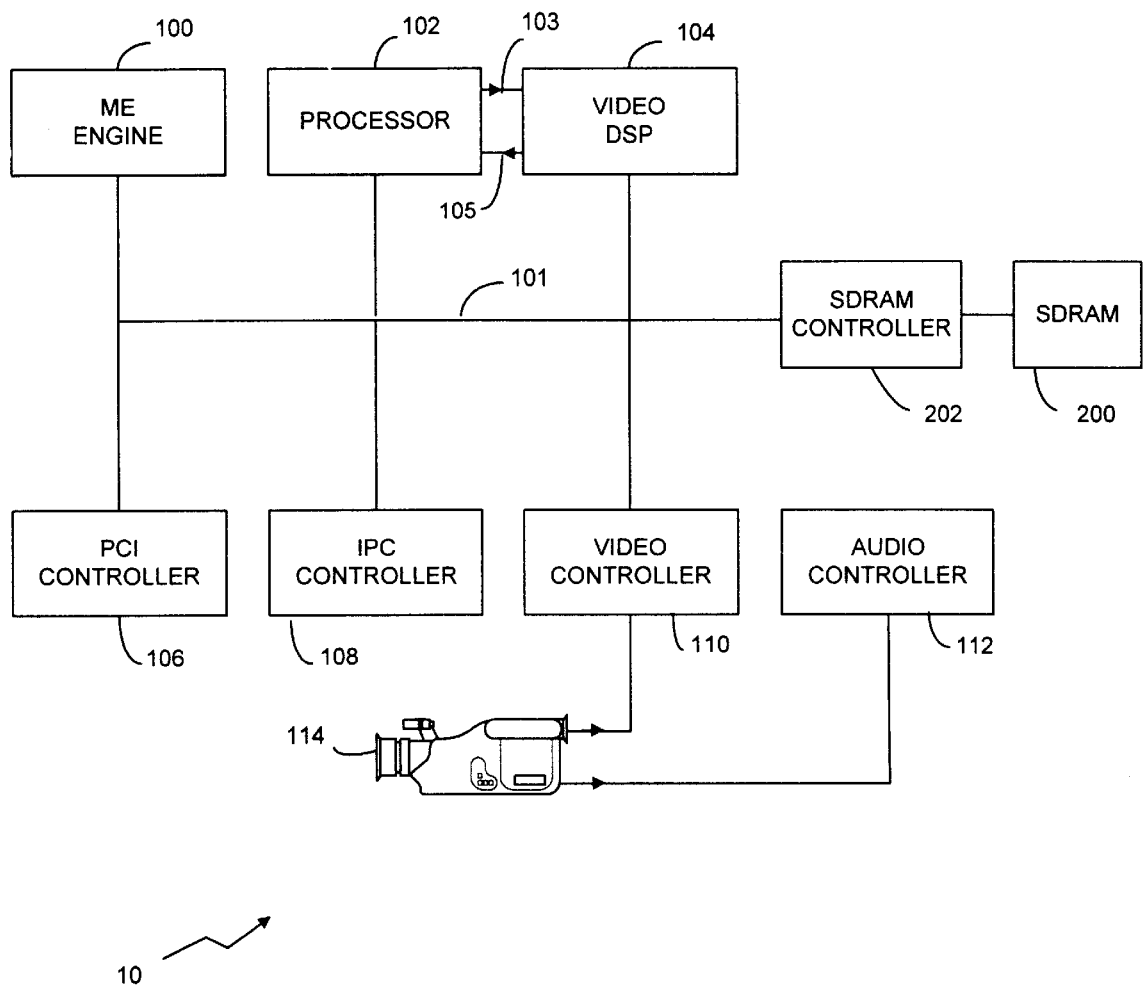
FIG. 1 is a schematic diagram of an image processing system.

FIG. 1 is a diagram illustrating a system 10 for processing and encoding video, image, and multimedia data. In the system 10, a motion estimation (ME) engine 100, which handles block matching operations, among others, is connected to a bus 101. The bus 101 is connected to a synchronous dynamic random access memory (SDRAM) controller 202, which controls an SDRAM array 200 having a plurality of SDRAM banks. The controller 202 manages SDRAM access operations as well as refresh operations of the SDRAM array 200. The SDRAM array 200 provides data storage for search command lists and frames of picture elements in the video data, among others. Preferably, a consistent representation is used for all frame data stored in the SDRAM 200, including reference frames, video channel input, and frames being coded.

As the controller 202 is responsible for generating all SDRAM addresses, it knows the address pattern ahead of time and is able to optimally schedule block accesses. The controller 202, along with the image data layout in memory, optimizes access time of the SDRAM 200 by sequencing the transfers to encourage multiple page hits within an SDRAM bank. Additionally, the efficiency of the SDRAM 200 is enhanced as precharge and row access operations of one SDRAM bank can take place at the same time as the data transfer operation of the other bank.

Also connected to the bus 101 is a processor 102 and a video digital signal processor (DSP) 104. The processor 102 is a general purpose central processing unit such as a SPARC processor, available from Sun Microsystems, Inc. of Mountain View, Calif. The video DSP 104 is a high level signal processing coprocessor that extends the instruction set of the processor 102 to include image filtering, activity, forward and inverse discrete cosine transformation (DCT), quantization, coding and decoding, and compositing operations. The video DSP 104 works in parallel with the processor 102 to off-load compute intensive pixel level processing operations. Internally, the video DSP 104 contains a separate DMA processor and a DSP processor connected by a double buffered working memory. The DMA processor transfers data to and from the external SDRAM 200 while the DSP processor performs signal processing operation. The processor 102 communicates with the video DSP 104 via an instruction bus 103 and a result bus 105.

Generally, when a DSP instruction is decoded by the processor 102, it is sent to the video DSP 104 for execution over the instruction bus 103. The instructions to the video DSP 104 are queued in two first in first out (FIFO) devices so that control code running on the processor 102 may execute in parallel with signal processing code running on the video DSP 104. Additionally, the output from the video DSP 104 are also buffered by another FIFO which is read by the processor 102. More details on the interactions between the processor 102 and the video DSP 104 are disclosed in copending, commonly assigned application Ser. No. 08/949,991, entitled "Out of Order Instruction Processing Using Dual Memory Banks", filed Oct. 14, 1997, and application Ser. No. 09/128,730, entitled "Dual-Prime Estimation Engine," filed Aug. 4, 1998, both hereby incorporated by reference.

The bus 101 is also connected to a plurality of devices, including a peripheral component interface (PCI) controller 106, an interprocessor channel (IPC) controller 108, a video controller 110 and an audio controller 112. The video controller 110 and the audio controller 112 are connected to a multimedia source such as a camera 114, among others. The PCI controller 106 allows the system 10 to be plugged into a personal computer or workstation with PCI slots for subsequent storage and handling of the video data.

The IPC controller 108 allows a plurality of systems 10 to operate in parallel to support high quality and high resolution videos. Using the IPC controller 108, each image processing system 10 may be assigned a horizontal slice of an image frame to process. As the search region of one image processing system 10 overlaps with neighboring slices, image reference data from the overlap region needs to be transmitted between each system 10 over the IPC controller 108. The daisy chain arrangement of multiple systems 10 using the IPC controller 108 advantageously exploits a locality of reference data transfers. Hence, the IPC controller 108 avoids bottlenecks associated with a shared bus architecture and is easily scalable to provide additional processing power if needed.

Figure 2:
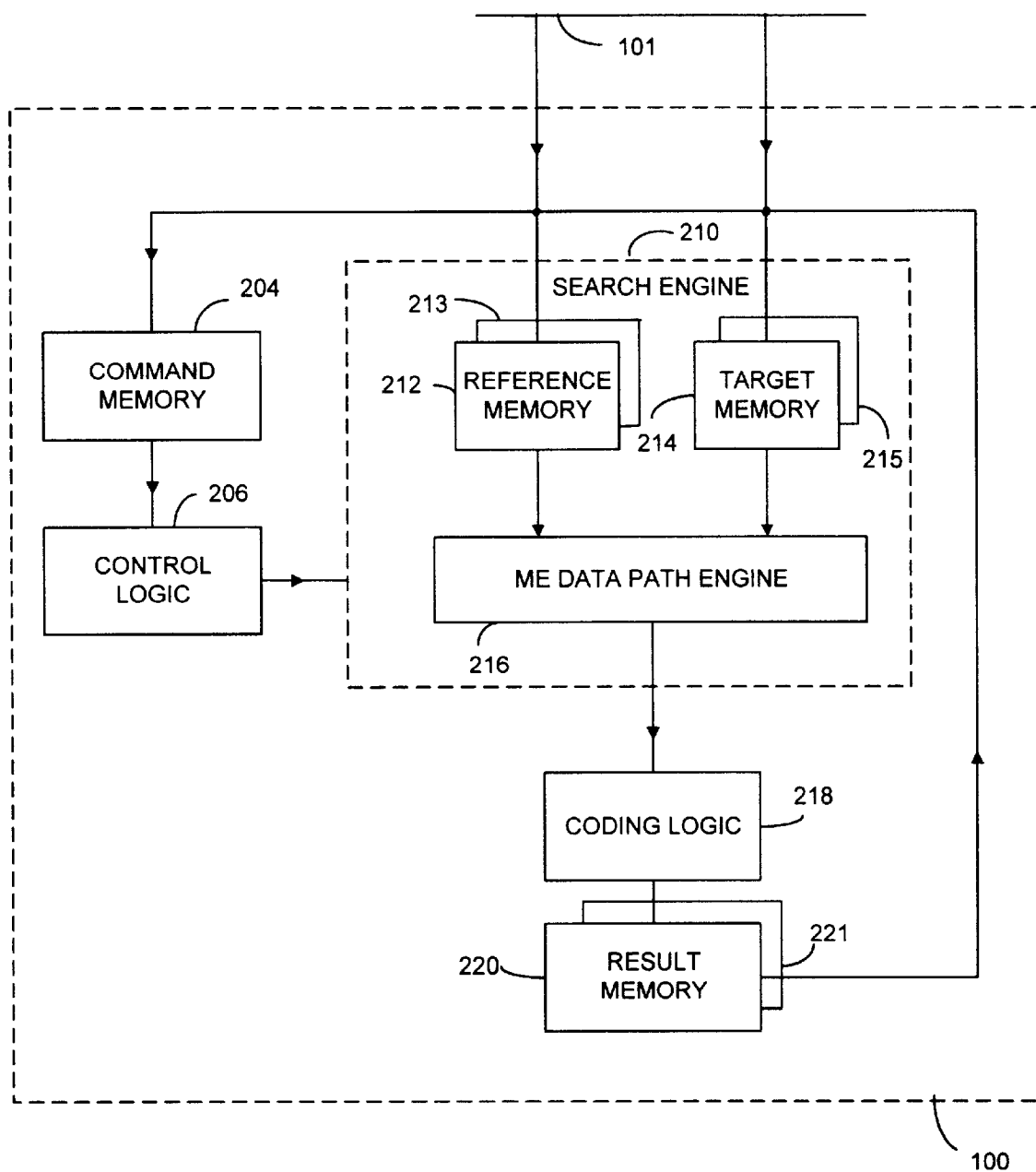
FIG. 2 is a schematic diagram of a motion estimation engine of FIG. 1.

FIG. 2 shows in more detail the ME engine 100. The ME engine 100 has a command memory 204 which receives command lists from the SDRAM 200 over the bus 101. The command memory 204 in turn provides data to a control logic 206 which controls a search engine 210. The search engine 210 has a pair of reference window memory (WMEM) 212 and 213 for storing reference image segments and a pair of target memory (TMEM) devices 214 and 215 for storing target image segments. The inputs of WMEMs 212 and 213 as well as TMEMs 214 and 215 are connected to the bus 101 to receive data from the SDRAM 200. As each search command is processed by the control logic 206, the appropriate target and reference image data for that target are loaded by the ME engine 100 from the SDRAM 200 into the appropriate WMEM 212 or 213 and TMEM 214 or 215. The outputs of the WMEMs 212 and 213 and the TMEMs 214 and 215 are then provided to a motion estimation data path engine 216.

In one embodiment, the WMEMs 212 and 213 are 32×32 memory devices while the TMEMs 214 and 215 are 16×16 memory devices. The TMEM 214 or 215 contains a block of data from each field, except for field pictures where the TMEM 214 or 215 contains targets from one field only. For frame searches, the WMEM 212 or 213 contains interleaved data from both reference fields. Similarly, the TMEM 214 or 215 is also accessed in an interleaved fashion. For field searches, the WMEM 212 or 213 contains data from the reference field being searched and the TMEM 214 or 215 fields are accessed separately, that is, they are non-interleaved.

The double buffering of the image reference regions using the WMEMs 212 and 213, as well as the target regions using TMEMs 214 and 215, allows the ME data path engine 216 to operate on one of the WMEM/TMEM pairs 212/214 or 213/215 while the other is loading data from the SDRAM 200. The double-buffering thus hides latencies associated with accessing the DRAM 200 from the operation of the data path engine 216.

The output of the data path engine 216 is provided to a coding logic 218 for handling, including the tokenizing of results. The output of the coding logic 218 is provided to a pair of result memory devices 220 and 221. The pair of result memory devices 220 and 221 are connected to the bus 101 to transmit results back to the SDRAM 200 via the SDRAM controller 202.

During operation, the ME engine 100 is controlled by a list of search commands stored in the SDRAM 200. The commands are downloaded into the command memory 204 and executed by the control logic 206. The control logic 206 decodes the search command and causes the ME engine 100 to load data from the SDRAM 200 to the WMEM 212 or 213 and the TMEM 214 or 215. The double buffering of the WMEMs and TMEMs allows the loading of the next image region to overlap with the processing of the current image region.

After receiving data from the WMEM 212 or 213 and the TMEM 214 or 215, the data path engine 216 performs a sum of 64 absolute differences. This is accomplished by sliding an 8×8 reference region over an 8×8 target region and computing the differences in parallel. The absolute differences are used to compute the MAD. The output of the data path engine 216 is processed by the coding logic 218 before stored in one of the result memory banks 220 or 221.

In the manner discussed above, after the processor 102 has set up various control registers and loaded search commands into the SDRAM 200, the ME engine 100 can independently operate on the list of search commands loaded from the SDRAM 200. After processing has completed, the ME engine 100 can write results back to the SDRAM 200. Further, at the end of the processing of the picture, the ME engine 100 can also issue an interrupt signal to the processor 102 so that the processor 102 can process the results in the SDRAM 200 and prepare commands associated with the next level of search, if necessary.

Although the ME engine 100 off loads much of the motion estimation processing, the processor 102 still retains a full control of critical search parameters, including the number of levels, search regions and range, target size, horizontal and vertical decimation, field versus frame search, among others. Hence, the ME engine 100 provides the flexibility of a processor controlled search engine, along with the performance of a hard wired engine.

Figure 3:
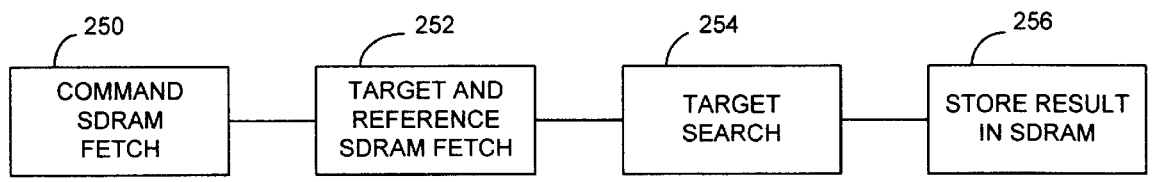
FIG. 3 is a diagram illustrating a motion estimation command processing pipeline.

The command processing pipeline for motion estimation engine 100 is illustrated in more detail in FIG. 3. In step 250, commands in the SDRAM are fetched. Next, target and reference data in the SDRAM 200 are fetched in step 252. From step 252, the target search is performed in step 254 and the result of the target search is stored back to the SDRAM 200 in step 256. When all the search commands have been processed, an interrupt is generated to the processor 102 so that the processor 102 can read results from the SDRAM 200 and set up search commands for the next level of hierarchical search. Thus, the ME engine 100 operates as an autonomous unit with minimum intervention from the processor 102. The results may be used to generate search commands for the next level of a hierarchical search or for motion compensation in the video DSP 104. Further, the generation of commands for the motion estimation engine 210 by the processor 102 may be overlapped with the DCT phase of macroblock encoding when the processor 102 is not needed to supervise the video DSP 104.

Figure 4:
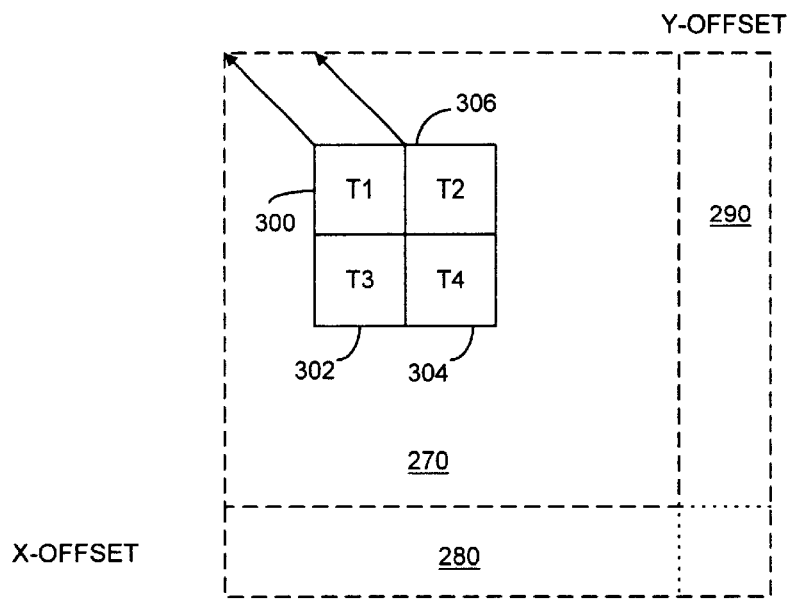
FIG. 4 is a diagram illustrating a sharing of a reference window among four adjacent targets in the motion estimation engine of FIG. 2.

Turning now to FIG. 4, the ME engine 100 also supports a split search command, where two or four search targets with common starting displacements may be searched using a single command to produce two or four search results. Split search commands allow the reference fetches to be shared by all targets in the split command. This action reduces the bandwidth loading on the bus 101 by up to four times and thus generates a significant performance gain.

In FIG. 4, a target T1 300 is shown with respect to a reference area 270. Field targets may be either 8×8 pels or 8×16 pels, while frame targets may be either 8×8 pels or 16×16 pels. In a conventional search, the search engine 210 (FIG. 2) repetitively applies the target T1 300 to the reference area 270 during the motion estimation process. In a split search, multiple targets T1 300, T2 306, T3 302 and T4 304 may share a portion of a common reference area 270. Further, the additional targets T2 306, T3 302 and T4 304 may need to search additional areas 280 or 290. To support the split search, a composite reference area consisting of areas 270, 280 and 290 are loaded into the reference memory WMEM 212 or 213 for use by the multiple search targets. Typically, the areas 280 and 290 extend the dimensions of the area 270 by eight pels in the horizontal and vertical directions.

During a split search, if the previous level horizontal resolution is half of the current level and the horizontal target size is the same, then two adjacent horizontal targets such as targets T1 300 and T2 306 can share the same data. This is called horizontal splitting. Similarly, if the previous level vertical resolution is half the current level and the vertical target size is the same, then two vertically adjacent targets such as T1 300 and T3 302 can share the same data. Vertical and horizontal splitting may occur at the same time, allowing up to four targets to share the same search region. Each split search command causes the WMEM 212 or 213 to be loaded with the composite reference areas 270, 280 and 290. The split search command will generate multiple results for targets that share the same reference data.

During the multiple hierarchical search of MPEG encoding, results generated during the current hierarchical search may be used in specifying subsequent search operations. In the ME engine 100, ME search commands and results preferably share a similar format so that the result from the current ME search can be used as the search command of the next stage of the hierarchical ME search process with minimum changes. Moreover, both command and result take the same memory size. In one embodiment, the command and result words are 32-bit in size.

Figure 5:
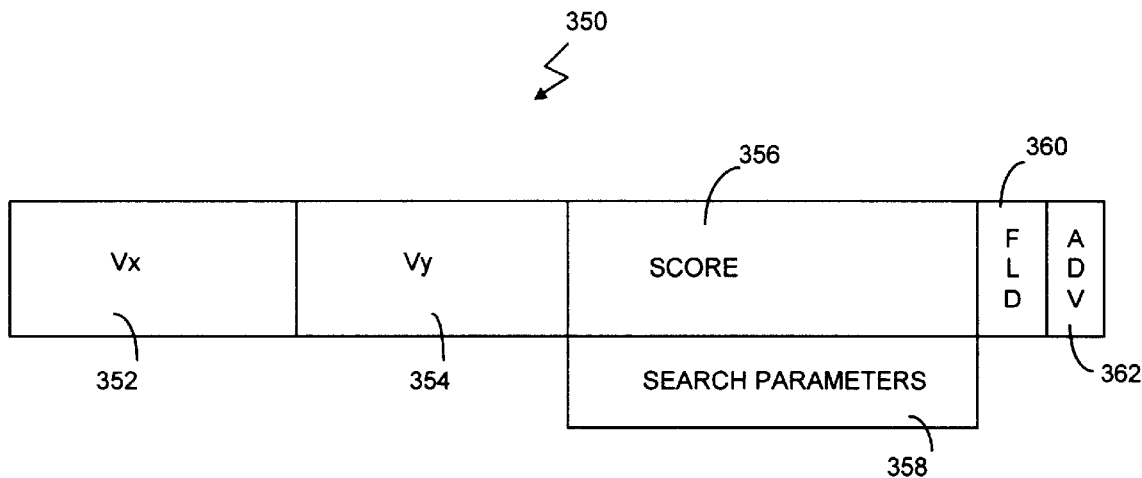
FIG. 5 is a diagram illustrating a shared format for encoding motion estimation search commands and results in the motion estimation engine of FIG. 2.

As shown in FIG. 5, each command or result format 350 has a horizontal displacement field $V_X$ 352, a vertical displacement field $V_Y$ 354, a score field 356, and a search parameter field 358. The $V_X$ field 352 and the $V_Y$ field 354 accept two's complement values in half pel units. If a search is to be performed, the $V_X$ field 352 specifies a horizontal displacement of the center of the search region in the reference frame from the center of the current target in the target frame. Alternatively, if the $V_X$ field 352 is to store the result of a search command, the $V_X$ field 352 represents the horizontal component of the motion vector. Correspondingly, as part of a search command, the $V_Y$ field 354 specifies a vertical displacement of the center of the search region in the reference frame from the center of the current target in the target frame. When used to store results of the operation, the $V_Y$ field 354 specifies a vertical component of the motion vector. Generally, the search command for a first stage of a hierarchical search set the $V_X$ field 352 and the $V_Y$ field 354 to zero. Latter stage search commands may use results stored in the $V_X$ and $V_Y$ fields 352 and 354 from the current search.

The score field 356 contains a compressed sum of the absolute difference of each pixel in the target and each pixel in the reference for the velocity specified by the $V_X$ and $V_Y$ fields 352 and 354. The score field 356 is used by the processor 102 to select the best strategy when multiple search candidates are being considered. The score field 356 is only present as part of a result command. The search parameter field 358 is part of a search command which specifies additional search parameters. Additionally, the search command or result format 350 may specify a field (FLD) bit 360 and an advance (ADV) bit 362. When set, the FLD bit 360 indicates that the operation relates to a field search command or result. When cleared, the FLD bit 360 indicates that the operation relates to a frame search command or result. The ADV bit 362 is set on the last search command for the current target and reference picture. When the ADV bit is set, the search direction is reversed. When not advancing, the same split targets are reused for additional reference region searches.

The common format in commands and results allows results of the current search to be used as part of the next search command in the sequence of hierarchical search or for motion compensation. The ease in revising results eliminates unnecessary processing and restoring of intermediate search results, thus enhancing performance.

As discussed above, through the double buffering of the memory subsystem, the shared command/result format, and the split search capability, the apparatus off-loads much of the motion estimation processing from the processor while allowing the processor to retain full control of critical search parameters. Thus, flexibility is preserved without affecting performance in the system.

The techniques described here may be implemented in hardware or software, or a combination of the two. Software may include microcode or conventional program implemented in a high level procedural or object-oriented programming language to communicate with a computer system. However, the programs can be implemented in assembly or machine language, if desired.

In the event the techniques are implemented in computer programs executing on programmable computers with a processor, a storage medium readable by the processor (including volatile and nonvolatile memory and/or storage elements), and suitable input and output devices, the program code is applied to data from an input device such as a video camera to perform the functions described and to generate motion estimation output information to be saved on a data storage device or transmitted over a medium.

While the invention has been shown and described with reference to one or more embodiments thereof, those skilled in the art will understand that the above and other changes in form and detail may be made without departing from the spirit and scope of the following claims.

What is claimed is:

1. An apparatus for performing motion estimation based on a reference image and a target image having a plurality of target blocks, comprising:

a command memory to store a motion estimation command list segment, the command list segment containing multiple different search commands, each command being appropriate for a different subset of a common target image, each subset comprising one or a plurality of target blocks of the common target image; and a search engine coupled to the command memory, the search engine performing multiple searches at the same time within the common target image by processing the command list segment stored in the memory, each search being for a different subset of the common target image, and producing a motion estimation result list, the result list containing corresponding search results for each search command in the command list segment.

2. The apparatus of claim 1, further comprising a result memory coupled to the motion estimation search engine, said result memory storing a result list segment.

3. The apparatus of claim 2, wherein the result memory is double-buffered.

4. The apparatus of claim 2, wherein the command list segment and the result list segment use an identical format for performing hierarchical searches.

5. The apparatus of claim 2, wherein the command list segment holds a search command having a command size and the result list segment holds a result having a result size, and wherein the command size equals the result size.

6. The apparatus of claim 1, wherein the motion estimation engine further comprises:

a reference window memory containing a reference data segment;

a target memory containing a target data segment; and a data path engine coupled to the reference window memory and the target memory, the data path engine generating a measure of differences between data in the reference window memory and data stored in the target memory.

7. The apparatus of claim 6, wherein the reference window memory is double-buffered.

8. The apparatus of claim 6, wherein the target memory is double-buffered.

9. The apparatus of claim 6, wherein the reference window memory allows reference data to be shared between a plurality of targets.

10. The apparatus of claim 9, wherein the reference data is accessed using an initial motion vector common to the plurality of targets.

11. The apparatus of claim 9, wherein the measure of differences is a sum of absolute differences.

12. The apparatus of claim 9, wherein the plurality of targets are horizontally adjacent.

13. The apparatus of claim 9, wherein the plurality of targets are vertically adjacent.

14. The apparatus of claim 9, wherein the plurality of targets are horizontally and vertically adjacent.

15. The apparatus of claim 2, wherein the search engine determines a best motion estimate for each target image.

16. The apparatus of claim 2, wherein the search engine stores a best score for each target image with each result in the result memory.

17. A method for performing motion estimation based on a reference image and a target image, comprising:

retrieving a motion estimation command list segment stored in a command memory, the command list segment containing multiple different search commands, each command being appropriate for a different subset of the target image, each subset comprising one or a plurality of target blocks within a common target image;

performing multiple searches at the same time within the common target image by processing the command list segment stored in the memory, each search being for a different subset of the common target image; and generating a motion estimation result in accordance with the command list segment, the result list containing corresponding search results for each separate search command in the command list segment.

18. The method of claim 17, further comprising storing a result list segment in a result memory.

19. The method of claim 18, wherein the result list segment storing comprises double-buffering the result list segment.

20. The method of claim 18, further comprising using an identical format for a search starting point in the command list segment and a motion vector in the result list segment.

21. The method of claim 18, wherein the command list segment holds a search command having a command size and the result list segment holds a result having a result size, and wherein the command size equals the result size.

22. The method of claim 17, wherein the motion estimation generating further comprises:

retrieving a reference data segment;

retrieving a target data segment; and generating a sum of absolute differences between the reference data and the target data.

23. The method of claim 22, wherein the reference data segment retrieving further comprise accessing a double-buffered memory.

24. The method of claim 22, wherein the target data segment retrieving further comprise accessing a double-buffered memory.

25. The method of claim 22, further comprising sharing reference data with a plurality of targets.

26. The method of claim 25, wherein the sharing of reference data further comprises providing a common initial motion vector to the plurality of targets.

27. The method of claim 25, wherein the measure of differences is a sum of absolute differences.

28. The method of claim 25, wherein reference data is shared by horizontally adjacent targets.

29. The method of claim 25, wherein reference data is shared by vertically adjacent targets.

30. The method of claim 25, wherein reference data is shared by horizontally and vertically adjacent targets.

31. The method of claim 17, wherein the generating of motion estimation result comprises determining a best motion estimate for each target image.

32. The method of claim 17, wherein the generating of motion estimation result comprises storing a best score for each target image with each result in the result memory.

33. An apparatus for performing motion estimation based on a reference image and a target image, comprising:

a command memory to store a motion estimation command list segment, the command list segment containing multiple different search commands, each command being appropriate for a different subset of a common target image, each subset comprising one or a plurality of target blocks within the common target image;

a search engine coupled to the command memory, the search engine performing multiple searches at the same time within the common target image by processing the command list segment stored in said memory, each search being for a different subset of the common target image, and producing a motion estimation result list, the result list containing corresponding search results for each separate search command in the command list segment, the search engine having:

a double-buffered reference window memory system containing one or more reference data segments;

a double-buffered target memory system containing one or more target data segments; and a data path engine coupled to the reference window memory system and the target memory system, the data path engine generating a measure of differences between data in the reference window memory system and data stored in the target memory system; and a double-buffered result memory system coupled to the motion estimation search engine, said double-buffered result memory system storing one or more result list segments.

34. The apparatus of claim 33, wherein the command list segment and the result list segment use an identical format for a search starting point in the command list segment and a motion vector in the result list segment.

35. The apparatus of claim 34, wherein the format for performing hierarchical searches includes a horizontal displacement field, a vertical displacement field, a score field, a search parameter field, a field bit, and an advance bit.

36. The apparatus of claim 33, wherein the reference window memory allows reference data to be shared between a plurality of targets.

37. The apparatus of claim 36, wherein the shared targets are vertically adjacent, horizontally adjacent, or a combination thereof.

* * * * *